United States Patent
Yoshida (10) Patent No.: US 9,042,861 B2
(45) Date of Patent: May 26, 2015

(54) EMERGENCY WIRELESS CONNECTION SYSTEM AND EMERGENCY WIRELESS CONNECTION METHOD

(75) Inventor: Toshio Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/297,510

(22) Filed: Nov. 16, 2011

(65) Prior Publication Data

US 2012/0129484 A1 May 24, 2012

(30) Foreign Application Priority Data

Nov. 24, 2010 (JP) ................................. 2010-261062

(51) Int. Cl.
*H04M 11/04* (2006.01)
*H04W 76/00* (2009.01)
*H04W 4/22* (2009.01)

(52) U.S. Cl.
CPC ............ *H04W 76/007* (2013.01); *H04M 11/04* (2013.01); *H04W 4/22* (2013.01)

(58) Field of Classification Search
CPC ..... H04W 84/18; H04W 76/007; H04W 4/22; H04W 88/04; H04W 24/00; H04W 76/023; H04W 4/008; H04W 84/047; G08B 25/016; G08B 19/00; G08B 25/004; G08B 27/00; H04M 11/04; H04M 1/72536; H04M 2242/04
USPC ............. 455/404.1, 404.2, 550.1, 414.1, 418, 455/421, 434, 515, 509, 566; 370/218, 397, 370/38; 340/906, 506; 379/40, 51
See application file for complete search history.

(56) References Cited

U.S. PATENT DOCUMENTS

| | | | | |
|---|---|---|---|---|
| 5,890,054 A * | 3/1999 | Logsdon et al. | ............. | 455/11.1 |
| 6,768,417 B2 * | 7/2004 | Kuragaki et al. | .......... | 340/425.5 |
| 7,356,305 B2 * | 4/2008 | Peeters | ........................ | 455/12.1 |
| 7,894,794 B2 * | 2/2011 | Boss et al. | ................. | 455/404.1 |
| 2004/0081117 A1 * | 4/2004 | Malek et al. | .................... | 370/324 |
| 2004/0192251 A1 * | 9/2004 | Zhao et al. | ................. | 455/404.1 |
| 2006/0030290 A1 * | 2/2006 | Rudolf et al. | .............. | 455/404.1 |
| 2006/0125630 A1 * | 6/2006 | Parkulo | .................... | 340/539.12 |

(Continued)

FOREIGN PATENT DOCUMENTS

| JP | 2002-44700 A | 2/2002 |
|---|---|---|
| JP | 2003272071 A | 11/2002 |

(Continued)

OTHER PUBLICATIONS

Japanese Office Action for JP Application No. 2010-261062 mailed on May 13, 2014 with partial English Translation.

(Continued)

*Primary Examiner* — Mahendra Patel
(74) *Attorney, Agent, or Firm* — Sughrue Mion, PLLC (57) ABSTRACT

An emergency wireless connection system which operates as a normal information terminal in normal times and operates as a terminal to send and receive emergency information in emergency situation includes a line detection unit which detects an emergency communication network capable of communicating when emergency situation occurs, and a control unit which makes the emergency wireless connection system conform to a procedure of the emergency communication network based on channel information of the emergency communication network detected by the line detection unit.

9 Claims, 8 Drawing Sheets

(56) References Cited

U.S. PATENT DOCUMENTS

| | | | |
|---|---|---|---|
| 2006/0142017 A1* | 6/2006 | Suzuki | 455/450 |
| 2009/0147929 A1* | 6/2009 | Zhao | 379/46 |
| 2010/0279647 A1* | 11/2010 | Jacobs et al. | 455/404.1 |
| 2011/0028117 A1* | 2/2011 | Pan | 455/404.1 |
| 2011/0034145 A1* | 2/2011 | Youn et al. | 455/404.1 |

FOREIGN PATENT DOCUMENTS

| | | |
|---|---|---|
| JP | 2003272071 A | 9/2003 |
| JP | 2003-283416 A | 10/2003 |
| JP | 20004320702 A | 11/2004 |
| JP | 2008-199553 A | 8/2008 |
| JP | 2009124448 A | 6/2009 |
| JP | 2010-178203 A | 8/2010 |
| TW | 200419943 A | 10/2004 |
| WO | 2010087411 A1 | 8/2010 |

OTHER PUBLICATIONS

Taiwanese Office Action for TW Application No. 100142269, issued on Mar. 3, 2014 with English Translation.

Chinese Office Action for CN Application No. 201110375455.8 dated Dec. 3, 2014 with English Translation.

Japanese Office Action for JP Application No. 2010-261062 mailed on Jan. 6, 2015 with English Translation.

* cited by examiner

EMERGENCY WIRELESS CONNECTION SYSTEM AND EMERGENCY WIRELESS CONNECTION METHOD

This application is based upon and claims the benefit of priority from Japanese Patent Application No. 2010-261062, filed on Nov. 24, 2010, the disclosure of which is incorporated herein in its entirety by reference.

TECHNICAL FIELD

The present invention relates to an emergency wireless connection system and an emergency wireless connection method.

BACKGROUND ART

When a large-scale disaster such as a big earthquake occurs, a general line such as a cellular phone may not be able to use by a system failure and a traffic concentration in a disaster area. In this case, a way for emergency contact from a disaster victim to fire-fighting and disaster prevention related parties is halted. When a way for emergency contact is halted, information gathering of such as the position of, the number of and the situation of disaster victims becomes difficult for fire-fighting and disaster prevention related parties. Accordingly, lifesaving within a survival time limit of 72 hours of initial motion becomes difficult.

In Japanese Patent Application Laid-Open No. 2009-124448, a portable communication system including a plurality of mobile terminals and an information server is proposed. In this portable communication system, in a case where a plurality of mobile terminals are outside the communication range of a wireless base station, by these mobile terminals performing short-distance communication, the communication range is extended, and information is shared. The information server is connected to a communication network of an independent type. When information is transmitted by short-distance communication from at least one mobile terminal to another mobile terminal located in the communication range, the communication network receives and holds information transmitted from the mobile terminal located in the communication range via a wireless base station. Then, according to a request from the mobile terminal located in the communication range, the communication network transmits the held information.

As a result, each mobile terminal which is outside the communication range of the wireless base station can share disaster information. Accordingly, even when a mobile terminal which exists within the disaster-stricken area cannot transmit disaster information because a communications infrastructure such as a communication network is shut down by a disaster, mobile terminals become to be able to communicate each other directly. That is, disaster information can be sent from outside of the communication range to the communication range.

In Japanese Patent Application Laid-Open No. 2003-272071, a monitoring system having a transmission means and a converting means is proposed. The transmission means receives an emergency notification wirelessly transmitted from a mobile terminal, and transmits this emergency notification to a monitoring center via a transmission line. The converting means converts the emergency notification from the mobile terminal into a wireless system suitable for a communication device of a public institution, and transmits it to the public institution.

However, when a communication failure occurs to a communication line which is usually used, systems disclosed by Japanese Patent Application Laid-Open No. 2009-124448 and Japanese Patent Application Laid-Open No. 2003-272071 mentioned above have a problem that they cannot be used any more. That is, they cannot perform communication about an emergency using a line besides a communication line which is usually used.

SUMMARY

Accordingly, the main purpose of the present invention is to provide an emergency wireless connection system and an emergency wireless connection method capable of communicating about an emergency even when a communication failure occurs to a communication line which is usually used.

An emergency wireless connection system which operates as a normal information terminal in normal times and operates as a terminal to send and receive emergency information in emergency situation includes a line detection unit which detects an emergency communication network capable of communicating when emergency situation occurs, and a control unit which makes the emergency wireless connection system conform to a procedure of the emergency communication network based on channel information of the emergency communication network detected by the line detection unit.

An emergency wireless connection method for operating as a normal information terminal in normal times and operating as a terminal to send and receive emergency information in emergency situation includes a line detection procedure for detecting an emergency communication network capable of communicating when emergency situation occurs, and a control procedure for making an emergency wireless connection system conform to a procedure of the emergency communication network based on channel information of the emergency communication network detected by the line detection procedure.

BRIEF DESCRIPTION OF THE DRAWINGS

Exemplary features and advantages of the present invention will become apparent from the following detailed description when taken with the accompanying drawings in which:

FIG. 7 is a block diagram of a cellular phone in an emergency wireless connection system of the second exemplary embodiment; and.

EXEMPLARY EMBODIMENT

First Exemplary Embodiment

Figure 1:
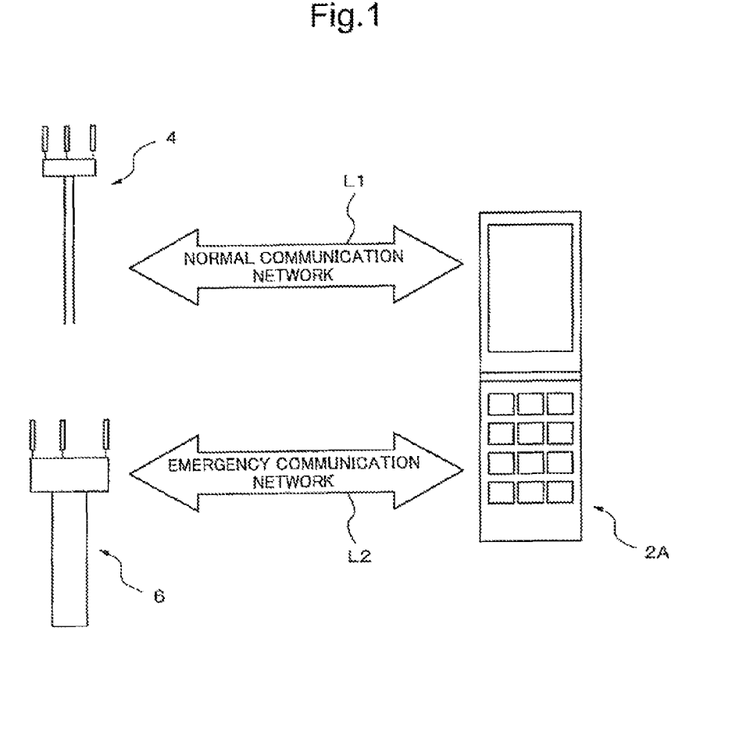
FIG. 1 is a schematic diagram which outlines an emergency wireless connection system according to a first exemplary embodiment of the present invention.

The first exemplary embodiment of the present invention will be described. FIG. 1 is a schematic diagram which outlines an emergency wireless connection system according to the present invention.

In normal times, a cellular phone (hereinafter, terminal) 2A performs communication via a phone line (hereinafter, referred to as a normal communication network) L1 and a relay station (hereinafter, normal relay station) 4. In emergency situations, the terminal 2A performs communication via a wireless line (hereinafter, emergency communication network) L2 capable of sending and receiving in an emergency site such as of a public utility enterprise and an institutional-use relay station (hereinafter, emergency relay station) 6.

When a situation in which communication via the normal communication network L1 is not possible occurs due to a failure of the normal relay station 4 caused by a factor of some sort, the terminal 2A performs detection of an emergency communication network. Detection of an emergency communication network is performed by detecting a broadcasting control channel.

The broadcasting control channel is one of control channels (CCH: Control CHannel) defined in mobile communication of the standard digital method. A control channel is a one-way channel for a relay station to broadcast control information (hereinafter, referred to as channel information) such as information for location registration, information about a channel structure and system information to terminals. A terminal which has received channel information performs setting of itself based on this channel information. As a result, it can communicate now via a relay station specified by the channel information.

Figure 2:
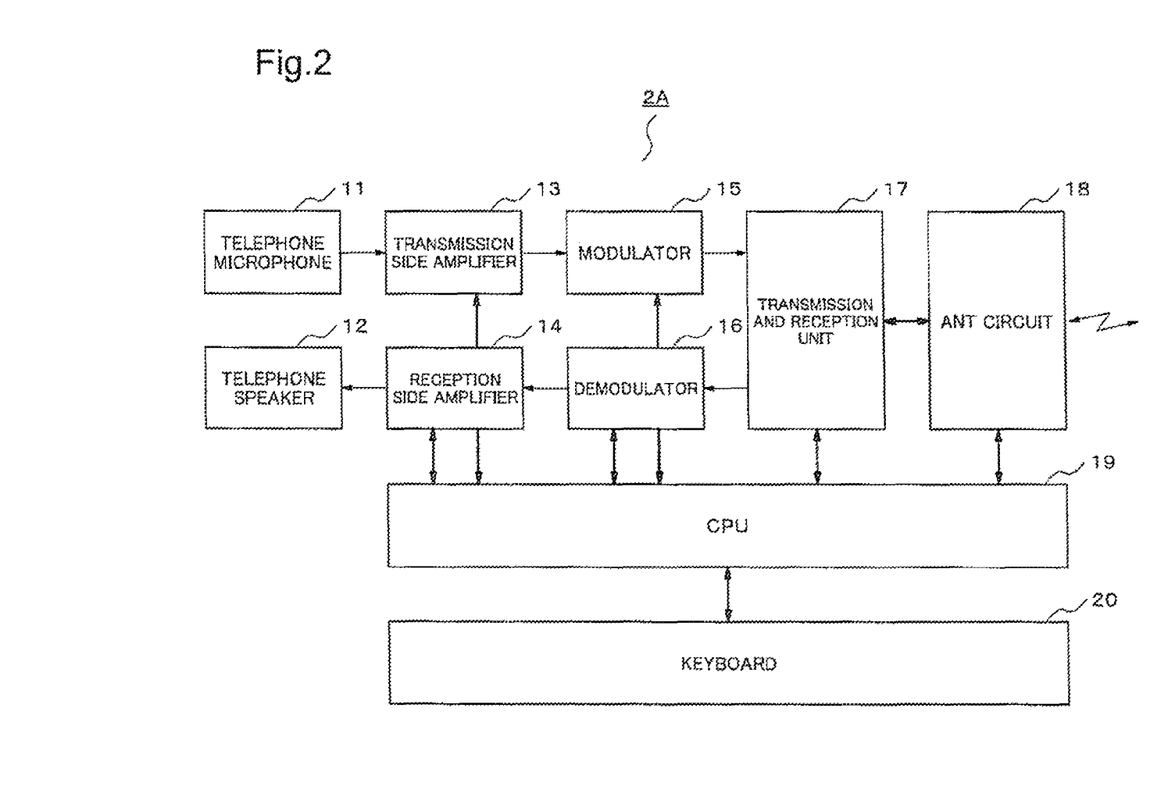
FIG. 2 is a block diagram of a cellular phone in an emergency wireless connection system of the first exemplary embodiment.

Hereinafter, description will be made in detail. FIG. 2 is a block diagram of the terminal 2A mentioned above. The terminal 2A includes a telephone microphone 11, a transmission side amplifier 13, a modulator 15, a transmission and reception unit 17, an ANT circuit 18, a demodulator 16, a reception side amplifier 14, a telephone speaker 12, a CPU (Central Processing Unit) 19 and a keyboard (an occurrence-of-emergency input unit) 20. The transmission and reception unit 17, the ANT circuit 18 and the demodulator 16 constitute a line detection unit, and the CPU 19 constitutes a control unit.

The telephone microphone 11 converts user's voice into an electric signal. The transmission side amplifier 13 amplifies the signal from the telephone microphone 11. The modulator 15 converts the signal from the transmission side amplifier 13 into a predetermined data signal. The transmission and reception unit 17 modulates the data signal from the modulator 15 into a signal of a predetermined communication method, and, in addition, converts a reception signal from the antenna circuit 18 into a data signal. The ANT circuit 18 is optimized to a communication method to be used, and performs sending and receiving of a signal.

The demodulator 16 converts a signal from the transmission and reception unit 17 into an analog signal. The reception side amplifier 14 amplifies the signal from the demodulator 16. The telephone speaker 12 converts the electric signal from the reception side amplifier 14 into a voice signal and outputs it. The keyboard 20 forms an input interface of various kinds of information. The CPU (Central Processing Unit) 19 controls all of the transmission side amplifier 13, the reception side amplifier 14, the modulator 15, the demodulator 16, the transmission and reception unit 17 and the ANT circuit 18.

In normal times, voice is converted into an analog transmission voice signal by the telephone microphone 11, and then amplified by the transmission side amplifier 13. The amplified transmission voice signal is converted into a data signal for modulation by the modulator 15, and modulated into a signal of a predetermined communication method by the transmission and reception unit 17. Further, such predetermined communication method is a communication method for the normal relay station 4 that a terminal uses. In the followings, description will be made taking a CDMA (Code Division Multiple Access) method of 800-MHz band as an example. The ANT circuit 18 is set so that it may conform to a communication method to be used. Accordingly, a signal transmitted from and a signal received by this ANT circuit 18 will be a signal conforming to the communication method to be used.

A signal received by the ANT circuit 18 is converted by the transmission and reception unit 17 into a data signal for demodulation. Then, the data signal for demodulation is converted by the demodulator 16 into an analog signal. The analog signal is amplified in the reception side amplifier 14, and converted into a voice signal by the telephone speaker 12 to be listened.

On the other hand, in emergency situations in which sending to and receiving from the normal relay station 4 is not available, the CPU 19 displays "Out of the range" on a display which is not illustrated.

After that, the CPU 19 becomes a waiting status of input of an instruction to switch to an "emergency mode" from the keyboard 20. When the instruction of the emergency mode is inputted, the CPU 19 changes a demodulation method of the demodulator 16 to a mode for a broadcasting control channel. The CPU 19 also changes the reception frequencies of the ANT circuit 18 and the transmission and reception unit 17 to a frequency which has been extracted from a frequency list of the broadcasting control channels registered with the CPU 19 in advance. Meanwhile, as a communication method in emergency situations, a 400 MHz band SCPC (Single Channel Per Carrier) method and 800 MHz band TDMA (Time Division Multiple Access) method can be exemplified. Because a plurality of frequencies of broadcasting control channels are registered, the CPU 19 selects a frequency successively from the plurality of frequencies and detects a line outputting channel information.

Figure 3:
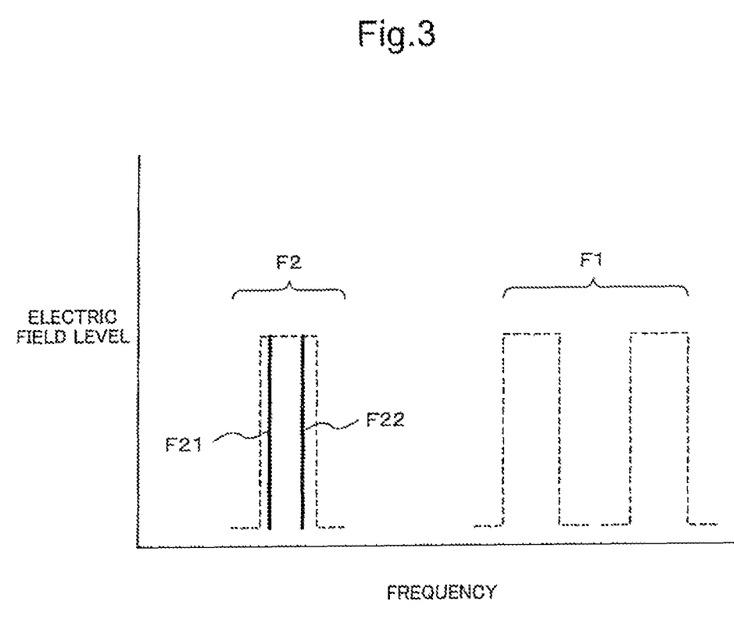
FIG. 3 is a diagram illustrating a bandwidth of a communication method used in normal times, and a bandwidth of a communication method used in emergency situations in an emergency wireless connection system of the first exemplary embodiment.

FIG. 3 indicates a bandwidth F1 used by a communication method in normal times and a bandwidth F2 used by a communication method used in emergency situations. Meanwhile, a frequency F21 indicates a frequency of a broadcasting control channel, and frequency F22 indicates a transmission and reception frequency designated by this broadcasting control channel.

As mentioned above, in a broadcasting control channel, channel information such as information about the channel and system information is included. That is, information for communicating using the emergency relay station 6 is included.

Accordingly, by determining whether received information is channel information of a broadcasting control channel or not, the CPU 19 determines whether the emergency relay station 6 has been able to be detected or not. When determining that the emergency relay station 6 has been detected, the content of the received information is analyzed, and a transmission and reception method is identified so that communication with the emergency relay station 6 can be performed via an emergency communication network.

The CPU 19 optimizes the ANT circuit 18 so that it may conform to the identified transmission and reception method, and changes modulation and demodulation method of the transmission and reception unit 17 and data modulation and demodulation methods of the modulator 15 and the demodulator 16 and the like to prepare for sending and receiving. When preparation for sending and receiving is completed, the CPU 19 changes "Out of the range" indication to "Within the range". As a result, the terminal 2A becomes able to communicate with the emergency relay station 6.

Figure 4:
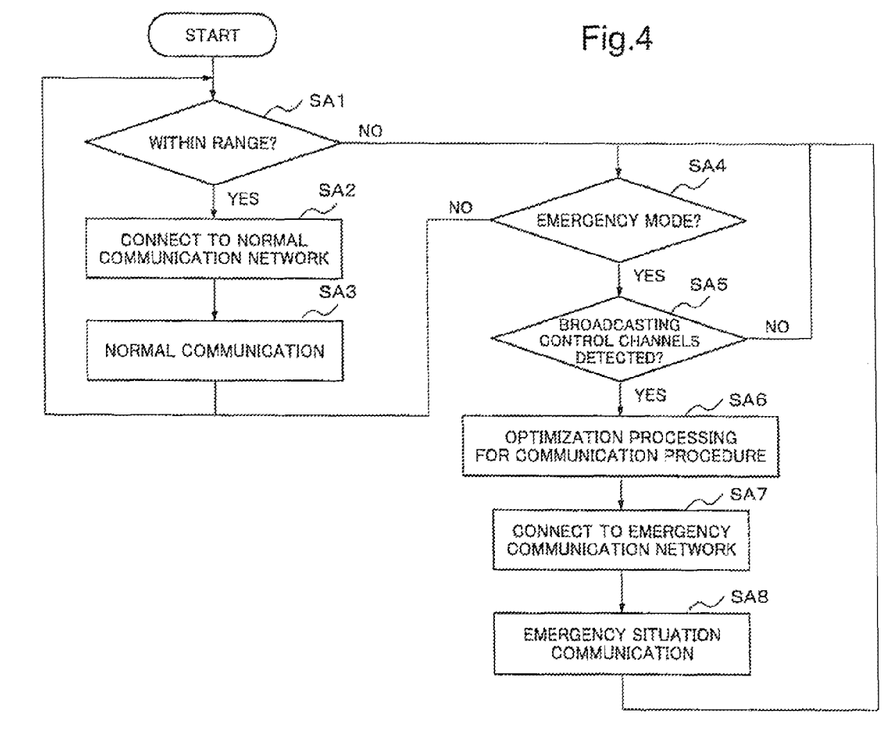
FIG. 4 is a flow chart of an emergency wireless connection system of the first exemplary embodiment.

Next, an operation of an emergency wireless connection system mentioned above will be described with reference to the flow chart of FIG. 4.

First, the CPU 19 performs determination of whether the normal communication network L1 is available (within the range) or not (step SA1). When the normal communication network L1 is available (in normal times), it advances towards step SA2. On the other hand, when it is not available (in emergency situations), the operation advances towards step SA4.

When the normal communication network L1 is available (in normal times), the CPU 19 carries out connection to the normal communication network L1 (step SA2), and performs usual communication (step SA3).

On the other hand, when the normal communication network L1 is not available (in emergency situations), the CPU 19 determines whether it is an emergency mode or not (step SA4). When being determined that it is not the emergency mode, the processing returns to step SA1, and when being determined that it is an emergency mode, the processing advances towards step SA5. Meanwhile, designation of the emergency mode is performed by a user operating a function key or the like provided in the terminal 2A.

When being determined as the emergency mode, the CPU 19 performs detection operation of a broadcasting control channel. When a broadcasting control channel is detected (step SA5), the CPU 19 sets the transmission and reception unit 17 and the antenna circuit 18 and the like so that they may become most suitable for the communication method indicated by the channel information of the detected broadcasting control channel (step SA6).

Figure 5:
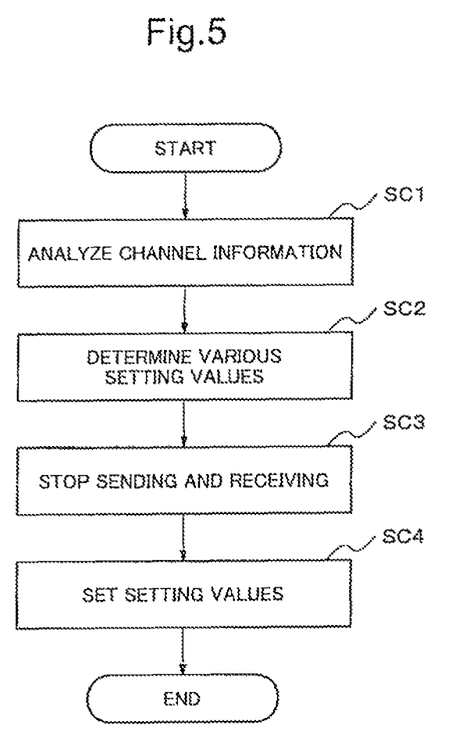
FIG. 5 is a flow chart about optimization processing in an emergency wireless connection system of the first exemplary embodiment.

This optimization processing is performed following a procedure as shown in FIG. 5. First, the CPU 19 analyzes channel information (step SC1). Based on the analysis result, the CPU 19 reads a modulation and demodulation method, a standard level and a connection protocol, and determine setting values of such as the transmission and reception unit 17 and the antenna circuit 18 (step SC2).

Exemplified as setting items are: a gain and a voice path of the transmission side amplifier 13; the gain and the voice path of the reception side amplifier 14; the modulation method of the modulator 15; the demodulation method of the demodulator 16; the filter, the gain and the limiter of the transmission and reception unit 17; and the center frequency, the bandwidth and the sensitivity of the ANT circuit 18.

The CPU 19 stops transmission and reception and sets the determined setting values to the transmission and reception unit 17 and the antenna circuit 18 and the like (step SC3, SC4).

After that, the CPU 19 performs connection to the line of the detected broadcasting control channel (in this case, the emergency communication network L2) (step SA7), and carries out communication of emergency situations (step SA8).

As it has been described above, when an emergency in which a line which is usually used (the normal communication network L1) becomes unavailable occurs, because another line (emergency communication network) which can communicate is detected, it becomes possible to perform communication using the detected emergency communication network.

Also, when an emergency communication network is used, high-quality communication can be performed because the own terminal is made be optimized to the communication method of the emergency communication network.

Further, a frequency and the like of a plurality of emergency communication networks are registered and prepared in advance, efficient detection of a line capable of communication becomes possible.

The Second Exemplary Embodiment

Next, the second exemplary embodiment of the present invention will be described. Meanwhile, description will be omitted appropriately using an identical symbol for a same structure as the first exemplary embodiment. In the first exemplary embodiment, when communication using the normal communication network L1 becomes impossible due to the normal relay station 4 causing a failure, communication (call) is made possible by detecting an emergency relay station. However, in emergency situations, there may be no room where a user notifies of an emergency by a call. Accordingly, according to this exemplary embodiment, it is arranged such that a user's notification load is reduced.

Figure 6:
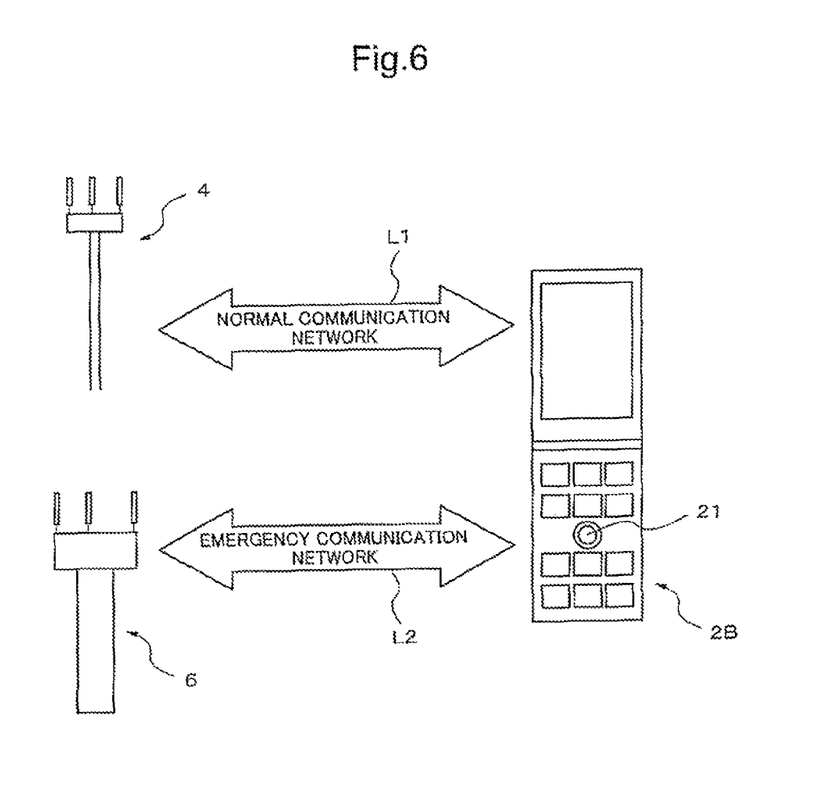
FIG. 6 is a schematic diagram which outlines an emergency wireless connection system according to a second exemplary embodiment of the present invention.
Figure 7:
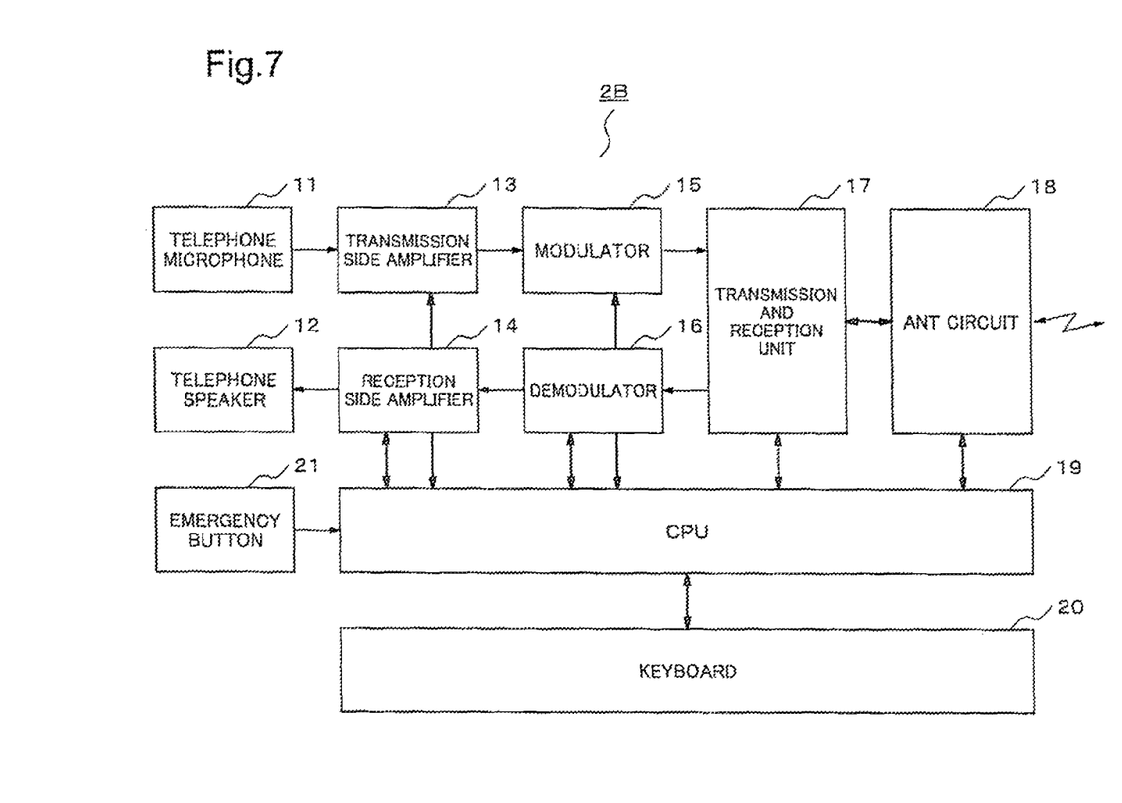

FIG. 6 is a schematic diagram which outlines an emergency wireless connection system according to the present exemplary embodiment. FIG. 7 is a block diagram of a terminal 2B. As shown in FIG. 6 and FIG. 7, the terminal 2B includes an emergency button 21. This emergency button 21 is a button for informing the CPU 19 that an emergency has occurred.

Figure 8:
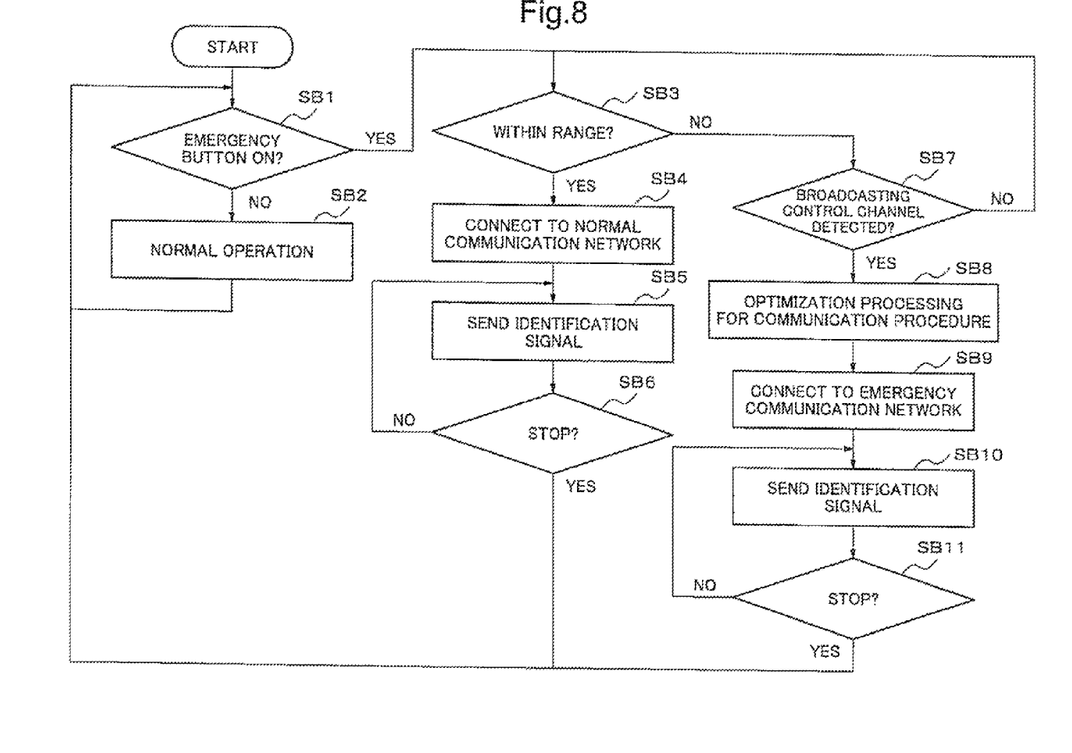
FIG. 8 is a flow chart of an emergency wireless connection system of the second exemplary embodiment.

FIG. 8 is a flow chart showing an operation of such emergency wireless connection system. First, the CPU 19 determines whether the emergency button 21 has been operated or not (step SB1). Meanwhile, because this emergency button 21 is a button which a user operates when an emergency occurs, it is desired that its operability is high. From this point of view, not a key such as a function key with which an instruction is decided via several times of operation, but a dedicated key is desired. When the emergency button 21 has not been operated, the processing advances towards step SB2, and the CPU 19 performs usual control. The processing advances towards step SB3 when the emergency button 21 is operated.

When the emergency button 21 is operated, the CPU 19 performs determination of whether the terminal 2B is located in the communication area (within the range) of the normal relay station 4 (step SB3). When the terminal 2B is located in the communication area of the normal relay station 4, the processing advances towards step SB4, and when the terminal 2B is located outside the communication area of the normal relay station 4, the processing advances towards step SB7.

When the terminal 2B is located in the communication area of the normal relay station 4, the CPU 19 performs line connection with a communication partner via the normal communication network L1 and the normal relay station 4, the communication partner being registered in advance (step SB4). Meanwhile, a communication partner may be a plurality of people such as near relatives and fire-fighting and disaster prevention related parties. When the communication partner replies, the CPU 19 outputs an identification signal (step SB5).

This identification signal includes identification information of a user, location information, emergency status information and the like. Accordingly, because it becomes possible for a communication partner who has received this identification signal to know that the user is in an emergency condition and to know information such as the user's position and communication method, support such as rescue work can be performed immediately. Then, the CPU 19 waits for a stop command of identification signal output (step SB6). A stop command of an identification signal output can be determined by the emergency button 21 being operated again, for example.

On the other hand, when the terminal 2B is determined to be located outside the communication area of the normal relay station 4 (out of the range) in step SB3, detection of a broadcasting control channel is performed and properness of channel information of the detected broadcasting control channel is determined (step SB7).

When channel information is proper, the CPU 19 performs optimization processing for making the transmission and reception unit 17 and the antenna circuit 18 and the like conform to the communication method which the channel information indicates (step SB8).

Meanwhile, this optimization processing is the optimization processing described with reference to FIG. 5 before.

Then, line connection with the communication partner registered in advance is made via the emergency communication network L2 and the emergency relay station 6 identified by the channel information (step SB9). When the communication partner replies, the CPU 19 outputs an identification signal (step SB10). This identification signal is continued until the user of the terminal 2B directs a stop of the identification signal (step SB11).

By the above, because even a user who has been buried under a collapsed house, for example, can inform occurrence of an emergency via a normal relay station or an emergency relay station by simply operating an emergency button, quick and appropriate rescue work becomes possible.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An emergency wireless connection system which operates as a normal information terminal in normal times and operates as a terminal to send and receive emergency information in emergency situation, comprising:
    a line detection unit which detects a channel information from an emergency communication network with which frequency and a communication method are different by using in order a plurality of frequency set up in advance, when an emergency situation occurs; and
    a control unit which analyzes the channel information on the emergency network detected by the line detection unit, and fits a transceiver function and an antenna circuit of a self-opportunity to the communication method of the emergency wireless connection system by reading a modulation and demodulation method and a connection protocol of the emergency wireless connection system based on the analysis result of the channel information.

2. The emergency wireless connection system according to claim 1, further comprising
    an occurrence-of-emergency input unit which makes the information terminal recognize occurrence of the emergency situation.

3. The emergency wireless connection system according to claim 2, wherein,
    the control unit performs line connection to the emergency communication network when the emergency wireless connection system is located outside a communication area of a normal communication network used in the normal times and an instruction of occurrence of the emergency situation is inputted by the occurrence-of-emergency input unit.

4. The emergency wireless connection system according to claim 2 wherein,
    the control unit performs automatic transmission of information of the emergency wireless connection system to a communication partner registered in advance using the normal communication network when the emergency wireless connection system is located in a communication area of a normal communication network used in the normal times and an instruction of occurrence of the emergency situation is inputted by the occurrence-of-emergency input unit.

5. The emergency wireless connection system according to claim 2, wherein,
    the control unit performs automatic transmission of information of the emergency wireless connection system to a communication partner registered in advance using the emergency communication network when the emergency wireless connection system is located outside a communication area of a normal communication network used in the normal times and an instruction of occurrence of the emergency situation is inputted by the occurrence-of-emergency input unit.

6. An emergency wireless connection method for operating as a normal information terminal in normal times and operating as a terminal to send and receive emergency information in emergency situation, comprising:
    a line detection procedure for detecting a channel information from an emergency communication network with which frequency and a communication method are different by using in order a plurality of frequency set up in advance, when an emergency situation occurs; and
    a control procedure for analyzing the channel information on the emergency communication network detected by the line detection procedure, and fits a transceiver function and an antenna circuit of a self-opportunity to the communication method of the emergency wireless connection system by reading a modulation and demodulation method and a connection protocol of the emergency wireless connection system based on the analysis result of the channel information.

7. The emergency wireless connection method according to claim 6, wherein
    the control procedure comprises a procedure for performing line connection to the emergency communication network when the emergency wireless connection system is located outside a communication area of a normal communication network used in a normal times and an instruction of occurrence of the emergency situation is inputted by an occurrence-of-emergency input unit.

8. The emergency wireless connection method according to claim 7, wherein
    the control procedure comprises a procedure for performing automatic transmission of information of the emergency wireless connection system to a communication partner registered in advance using the normal communication network when the emergency wireless connection system is located in a communication area of a normal communication network used in a normal times and an instruction of occurrence of the emergency situation is inputted by the occurrence-of-emergency input unit.

9. The emergency wireless connection method according to claim 7, wherein the control procedure comprises a procedure for performing automatic transmission of information of the emergency wireless connection system to a communication partner registered in advance using the emergency communication network when the emergency wireless connection system is located outside a communication area of a normal communication network used in a normal times and an instruction of occurrence of the emergency situation is inputted by the occurrence-of-emergency input unit.

* * * * *